United States Patent [19]

Takashima

[11] 4,010,936

[45] Mar. 8, 1977

[54] PROCESS FOR TAPPING A STEEL-MAKING CONVERTER

[75] Inventor: Masaru Takashima, Tokyo, Japan

[73] Assignee: Aikoh Co., Ltd., Tokyo, Japan

[22] Filed: Mar. 15, 1976

[21] Appl. No.: 667,009

Related U.S. Application Data

[63] Continuation of Ser. No. 476,496, June 5, 1974, abandoned.

[30] Foreign Application Priority Data

June 5, 1973 Japan .................. 48-62582

[52] U.S. Cl. .................. 266/45; 106/99; 266/240; 266/271
[51] Int. Cl.² .................. C21C 5/46
[58] Field of Search .............. 106/99; 266/45, 236, 266/240, 271

[56] References Cited

UNITED STATES PATENTS

| | | | |
|---|---|---|---|
| 2,110,053 | 3/1938 | Phillips | 106/99 |
| 3,092,505 | 6/1963 | Demaison | 106/99 |
| 3,776,532 | 12/1973 | Imberti | 266/272 |
| 3,841,885 | 10/1974 | Jakel | 106/99 X |
| 3,938,791 | 2/1976 | Imberti | 266/236 X |

Primary Examiner—Roy Lake
Assistant Examiner—Paul A. Bell
Attorney, Agent, or Firm—Sughrue, Rothwell, Mion, Zinn & Macpeak

[57] ABSTRACT

A stopper plug for a converter tap hole comprising a molding of a refractory material, a fibrous substance and a binder.

7 Claims, 2 Drawing Figures

PROCESS FOR TAPPING A STEEL-MAKING CONVERTER

This is a continuation of application Ser. No. 476,496 filed June 5, 1974, and now abandoned.

BACKGROUND OF THE INVENTION

1. FIELD OF THE INVENTION

This invention relates to an improvement in a stopper plug to be inserted in a tap hole of a converter, especially an LD converter, and more specifically, to a stopper plug which comprises a molding of a refractory material, a fibrous substance and a binder.

2. DESCRIPTION OF THE PRIOR ART

When a slag in a steel-making furnace flows out into a ladle together with the molten steel during tapping, a part of the slag is suspended in the molten steel without surfacing on the molten steel, and also the sulfur and phosphorus in the slag revert into the molten steel. Accordingly, the present practice is to perform tapping in such a manner that the slag in the furnace does not flow out together with the molten steel.

The tapping from a converter, especially an LD converter, is carried out by gradually tilting the converter in order to release the molten steel from a tap hole located at the upper part of the wall, with the tap hole being plugged previously with a wooden stopper plug. The plug is forced out of the hole as a result of the pressure of the molten steel which increases as the converter is tilted. As for the opening of the tap hole, it is important that the tap hole is opened by the pressure of the molten steel which increases as the tilting of the converter proceeds, and is not opened by the low pressure of the molten steel in an early stage when the molten steel begins to cover the plug. This prevents the slag floating on the molten steel from flowing out of the tap hole together with the molten steel. The tilting is stopped after almost all of the molten steel has flowed out and before the slag begins to flow out.

The stopper plug for the tap hole is made by shaping a piece of wood so that the shape of the plug conforms to that of the tap hole. However, it is very difficult to shape a piece of wood into a shape exactly corresponding to the tap hole.

When the converter has been used many times, the brick at the tap hole is corroded by the molten steel and the hole is deformed. Furthermore, the stopper plug does not have a shape corresponding exactly to the tap hole. The mere insertion of the stopper plug in the tap hole does not ensure complete plugging of the tap hole. Accordingly, the tap hole must be plugged by filling a sealing material such as mortar around the stopper plug.

As described above, the stopping of the tap hole is very complicated. Also, since the stopper plug is firmly fixed by the mortar, frequently the plug is not forced out by the pressure of the molten steel caused by the tilting of the converter.

SUMMARY OF THE INVENTION

This invention provides a stopper plug for a converter tap hole comprising a molding of a refractory material, a fibrous substance and a binder which eliminates the problems described above.

DETAILED DESCRIPTION OF THE INVENTION

Figure 1:
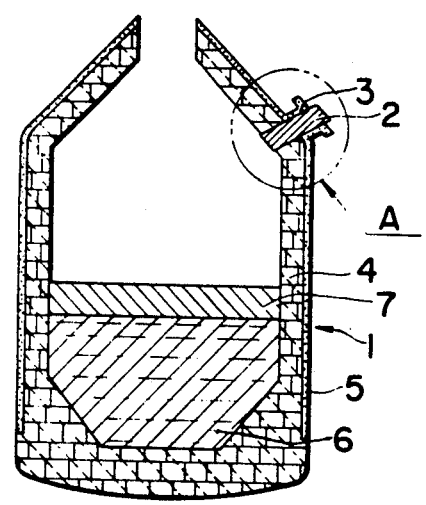
FIG. 1 is a schematic longitudinal sectional view illustrating a converter in which the tap hole at the upper part of the wall is plugged with the stopper plug of this invention.

The mere insertion of this stopper plug can ensure a complete plugging of the tap hole of the converter without using a sealing material such as mortar. In addition, the stopper plug can be produced very simply in a shape exactly corresponding to the shape of the tap hole.

The refractory material used in this invention can be a non-porous refractory material such as silica, quartz, magnesia, olivine, sand, mullite, aluminum oxide (such as alumina, "Alundum" (trademark), and corundum), chamotte, aluminum ash, dolomite, magnesite, limestone, fly ash or bauxite, or a porous refractory material such as diatomaceous earth, lapilli, expanded vermiculite, expanded shale, expanded obsidian, expanded perlite, or expanded pitch-stone. The refractory material is a principal component of the stopper plug and serves to enhance the refractory properties of the plug.

Examples of suitable fibrous substances are inorganic fibrous substances such as asbestos, rock wool, slag wool, glass wool or steel wool, or organic fibrous substances such as pulp, a cellulosic substance made by unbinding paper, cotton, flax or synthetic fibers. The fibrous substance reinforces the stopper plug of the molding to prevent the stopper plug from breaking on impact during handling, for example, during its transfer or setting into the converter; and imparts elasticity, porosity and shrinking properties to the plug.

Examples of suitable binders are resin binders such as phenol-formaldehyde resins, urea-formaldehyde resins, furan resins, or epoxy resins, organic binders such as dextrin or starch, or inorganic binders such as water glass, cement or clay.

When it is desired to expedite the opening of the tap hole, it is preferred to incorporate a combustible substance into the plug-forming composition. Examples of suitable combustible substances are wood powder, saw dust, coke powder, and coal powder.

One preferred composition for the stopper plug in accordance with the present invention is as follows:

|  | % by weight |
|---|---|
| Refractory Material | 40 to 70 |
| Organic Fibrous Substance | 15 to 35 |
| Inorganic Fibrous Substance | 5 to 20 |
| Combustible Substance | 5 to 20 |
| Binder | 1 to 7 |

The stopper plug in accordance with this invention is a porous molding which is elastic and is capable of shrinking and deformation. As for the plugging of the tap hole, a stopper plug having a diameter somewhat larger than the diameter of the tap hole is preferred. Even when the tap hole is somewhat deformed as a result of corrosion by molten steel, the mere tight insertion of this plug into the tap hole can lead to complete plugging and sealing of the tap hole without the necessity for a sealing material such as mortar.

The stopper plug so inserted is not forced out by the low pressure of the molten steel in the early stage when the converter is tilted and the molten steel begins to cover the stopper plug. Instead, the stopper plug is forced out of the tap hole by the pressure of the molten steel which increases as the tilting progresses. Accordingly, the slag floating on the molten steel does not flow out together with the molten steel.

To facilitate the opening of the tap hole, a stopper plug containing a combustible substance as described above or an organic fibrous substance as the fibrous substance, or a resin or organic binder as the binder is preferred. On the other hand, to retard the opening of the tap hole, a stopper plug which contains a large amount of the refractory material, or an inorganic fibrous substance as the fibrous substance, or an inorganic binder as the binder is preferred.

One preferred example of a method for producing the stopper plug in accordance with the present invention is described below.

In order to disperse the fibrous substance uniformly, water or another liquid is added to the plug-forming components, and they are mixed to form a slurry or paste. The slurry or paste is charged into a mold for dehydrating and molding, e.g., a metallic mold which is provided with a wire net, and dehydrated in a vacuum or using a press to form a green dehydrated molding. The dehydrated molding is then dried and solidified to form the molding used as a plug.

As another example, the slurry or paste stage is eliminated. In this case, a mixture of the components of the stopper plug is charged into a mold to form a green molding, and the green molding is dried and solidified to form the molding for use as a plug. To disperse the fibrous substance uniformly, preferably a surface active agent is added at the time of mixing the plug-forming components.

The stopper plug for a converter tap hole in accordance with the present invention will be described more specifically with reference to the accompanying drawings.

Referring to FIG. 1, a tap hole 3, which is located at the upper part of the wall of a converter 1, is plugged with a stopper plug 2. The converter 1 is lined with lining brick 4 and stamping material 5, and contains molten steel 6 and slag 7.

Figure 2:
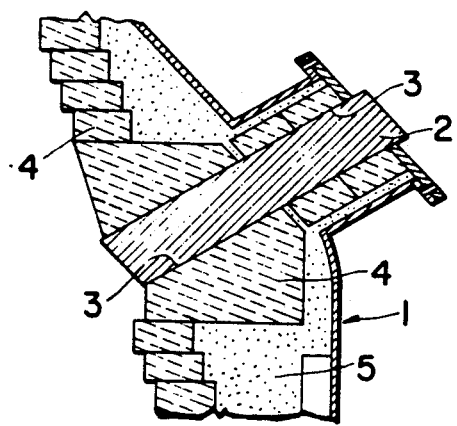
FIG. 2 is an enlarged view of portion A of FIG. 1.

In FIG. 2, the tap hole 3 is made of the lining brick 4 and the stamping material 5. The tap hole 3 is plugged by the stopper plug 2 of this invention using a tool such as an iron pipe or bar.

After the completion of steel-making, the converter 1 is tilted toward the tap-hole side. The stopper plug 2 comes out because of the pressure of the molten steel 6 which increases as the tilting progresses, and the tap hole is opened. The opening of the tap hole is accomplished when the molten steel 6 has covered the plug so completely that there is no more possibility of the slag 7 flowing out together with the molten steel 6.

One specific example of this invention is given below to illustrate the invention in greater detail. Unless otherwise indicated all parts and percents are by weight.

EXAMPLE

Water was added to a mixture of 51% by weight of siliceous sand, 22% by weight of pulp, 11% by weight of slag wool, 11% by weight of wood powder and 5% by weight of starch to form a slurry. The slurry was charged into a dehydration mold, and dehydrated in a vacuum to produce a dehydrated molding. The dehydrated molding was dried and solidified at a temperature of about 100° C to manufacture a stopper plug. This plug was of a truncated cone shape with a length of 500 mm, a diameter at one end surface of 160 mm and a diameter at the other end surface of 130 mm.

Tests were performed ten times in a 100-ton LD converter. In each test, the stopper plug was inserted into the tap hole of the converter using an iron bar to plug and seal the tap hole. Steel was manufactured in the converter in which the tap hole was so plugged. After the steel-making, the converter was tilted toward the tap-hole side. The stopper plug came out of the hole because of the pressure of the molten steel, and tapping was effected. In each test, hardly and flow-out of the slag at the time of tapping occurred.

While the invention has been described in detail and with reference to specific embodiments thereof, it will be apparent to one skilled in the art that various changes and modifications can be made therein without departing from the spirit and scope thereof.

What is claimed is:

1. A process for tapping a converter of a steel-making furnace which converter has a tap hole, which comprises (1) placing a stopper plug in the tap hole located at the upper part of a wall of the converter when said converter is in an upright position, said stopper plug comprising a refractory material, a fibrous substance and a binder and being elastic and capable of shrinking and deformation, said stopper plug being larger in diameter than the diameter of the tap hole; and (2) tilting the converter such that the molten steel therein contacts the stopper plug and exerts an increasing pressure on the stopper plug as the tilting proceeds, said stopper plug not being forced out of said tap hole until said stopper plug is completely covered with molten steel.

2. The process of claim 1, wherein said refractory material in said stopper plug is at least one of silica, quartz, magnesia, olivine, sand, mullite, aluminum oxide, chamotte, aluminum ash, dolomite, magnesite, limestone, fly ash, bauxite, diatomaceous earth, lapilli, expanded vermiculite, expanded shale, expanded obsidian, expanded perlite, or expanded pitch-stone.

3. The process of claim 1, wherein said fibrous substance in said stopper plug is at least one of an inorganic fibrous substance selected from the group consisting of asbestos, rock wook, slag wool, glass wool and steel wool, an organic fibrous substance selected from the group consisting of pulp, a cellulosic substance made by unbinding paper, cotton, flax, and synthetic fibers.

4. The process of claim 1, wherein said binder in said stopper plug is at least one of a phenol-formaldehyded resin, a ureaformaldehyde resin, a furan resin, an epoxy resin, dextrin, starch, water glass, cement or clay.

5. The process of claim 1, wherein said stopper plug includes a combustible substance.

6. The process of claim 5, wherein said combustible substance is at least one of wood powder, saw dust, coke powder or coal powder.

7. The process of claim 6, wherein said stopper plug comprises about 40% to 70% by weight of said refractory material, about 15 to 35% by weight of said organic fibrous substance, about 5 to 20% by weight of said inorganic fibrous substance, about 5 to 20% by weight of said combustible substance and about 1 to 70% by weight of said binder.

* * * * *